United States Patent [19]

McCormick et al.

[11] Patent Number: 4,906,305
[45] Date of Patent: Mar. 6, 1990

[54] METHOD OF MAKING A COMPOSITE DRAWN ARTICLE

[75] Inventors: Ronald J. McCormick, Pittsburgh; G. Leonard Yeager, Sarver, both of Pa.

[73] Assignee: Allegheny Ludlum Corporation, Pittsburgh, Pa.

[21] Appl. No.: 233,687

[22] Filed: Aug. 18, 1988

[51] Int. Cl.$^4$ ................................................ C21D 8/00
[52] U.S. Cl. .............................. 148/11.5 Q; 228/235; 228/19 D; 228/263.15; 228/158
[58] Field of Search .............. 148/11.5 Q, 12 E, 12 C; 428/683; 228/235, 19 D, 263.15, 231, 158

[56] References Cited

U.S. PATENT DOCUMENTS

| | | | |
|---|---|---|---|
| 3,693,242 | 9/1972 | Chivinsky | 29/480 |
| 3,915,666 | 10/1975 | Veitl et al. | 428/683 |
| 3,956,809 | 5/1976 | Chivinsky | 29/196.1 |

FOREIGN PATENT DOCUMENTS

| | | | |
|---|---|---|---|
| 2413161 | 10/1975 | Fed. Rep. of Germany | 428/683 |
| 2150151 | 6/1985 | United Kingdom | 428/683 |

OTHER PUBLICATIONS

Diffusion of Carbon in Austenite with a Discontinuity of Composition, L. S. Darken, *Trans. of AIME*, 1949, vol. 180, pp. 430–438.

*Primary Examiner*—Deborah Yee
*Attorney, Agent, or Firm*—Patrick J. Viccaro

[57] ABSTRACT

To obtain a composite material which has a substantially reduced incidence of defects after forming, there is made a composite having at least one layer of plain-carbon steel and, between it and a layer of stainless steel, an interleaving layer of silicon steel.

4 Claims, 1 Drawing Sheet

METHOD OF MAKING A COMPOSITE DRAWN ARTICLE

BACKGROUND OF THE INVENTION

1. Field of the Invention

This invention relates to a composite material which has a substantially reduced incidence of defects after forming, and to a method of producing it. The composite material comprises at least one layer of plain-carbon steel, at least one layer of stainless steel, and between said layers, a layer of steel containing 0.5 percent or more of silicon.

2. Description of the Prior Art

Pressure-bonded composite members are used in a variety of applications. Cookware is often drawn from composite material comprised of plain-carbon and stainless steel. Plain-carbon steel is a better heat conductor than is stainless steel. On the other hand, stainless steel has a more attractive appearance and is stain-resistant to a variety of contaminants. Accordingly, a composite of the two metals is most desirable, as it combines the advantages of each metal.

Deep-drawn articles made from pressure-bonded composite materials of the kind indicated above have displayed surface defects which have become evident during and after drawing. These defects include an "orange peel" surface, wavy or wrinkled surfaces and surface ruptures which are exceedingly detrimental as they cannot be satisfactorily removed by such techniques as buffing or grinding.

It is known, for example, from U.S. Pat. No. 3,693,242, and U.S. Pat. No. 3,956,809, that in the production of such composite materials, an improvement in respect to the avoidance of defects may be obtained by using a plain-carbon steel to which there has been added an appropriate amount of a carbide-forming element such as titanium or columbium. In the above-mentioned patents it is hypothesized that the occurrence of defects is promoted by migration of carbon from the plain-carbon steel into the part of the stainless steel layer immediately adjacent thereto. The above-mentioned patents contain the observation that a migration of carbon can and often does occur in a direction opposite to the carbon gradient, i.e., from a material of lower carbon content to one of higher carbon content. The direction of carbon migration is dependent upon the attainment of a condition of lower free energy, and not strictly upon concentration gradients. Those skilled in the art will understand that with the approach of the two above-mentioned patents, using a plain-carbon steel which has a composition modified to contain an appropriate amount of a strong carbide-forming element, the carbon present in the plain-carbon steel tends to be present in the form of precipitates, rather than being in solution in the iron and correspondingly more readily available for migration. Those skilled in the art will also appreciate that there are advantages to be obtained if it is not necessary to resort to the use of a plain-carbon steel which has a particular modified composition containing the above-indicated appropriate amount of carbide-forming element; it is advantageous to be able to use, for the plain-steel layer, an ordinary plain-carbon steel, of a kind which is more generally available in greater quantities, and is, moreover, susceptible of being diverted to other uses if not needed for the production of composite articles of the kind indicated above.

In the industry of making specialty-steel products, it is known to manufacture various types or grades of non-oriented or grain-oriented silicon-containing electrical steel, and that these are not infrequently produced in the form of strip having a thickness on the order of 0.007 to 0.015 inch. Such steel regularly contains in excess of 0.5 percent of silicon, and commonly on the order of 3 percent silicon. Moreover, in the electrical-steel art, it is well known that carbon is generally detrimental to the desired electrical properties, and consequently, such steels are often made with an aim carbon content of approximately 0.03 percent or lower. Moreover, the process for making a high-performance grade of grain-oriented silicon steel is a complicated, exacting, multi-step procedure involving a succession of cold-rollings and annealings, in the course of which there is necessarily produced a certain quantity of flat-rolled silicon-bearing steel of suitably low carbon content, perfectly satisfactory for use in the practice of the present invention, but not capable of being sold as high-performance electrical steel. Commonly, any specialty-steel manufacturer capable of producing of AISI type 304 stainless steel, whether for the cladding in a composite product of the kind mentioned above or for other purposes, has been likely also to be engaged in the production of such electrical steels.

The usual manipulative steps are known in the art of the making of a pressure-bonded composite material as hot-rolled or later as cold-rolled. First, it is known, in general, to form a sandwich containing desired layers of the materials to be bonded, and to work in a non-oxidizing or reducing atmosphere, using vacuum, inert gas, or hydrogen, supplying heat by various means and applying pressure by various means, such as roll stands, platens or explosives. It can be taken as known that a composite material so formed may then be further cold-rolled to a desired gauge in one or more stages, using, as necessary, annealing treatments at a temperature in excess of 1800 degrees Fahrenheit.

The prior art further includes the article of L.S. Darken about diffusing of carbon in austenite in the Transactions of the AIME, 1949, Volume 180, Pages 430–438. This article presents data which confirm the existence of the phenomenon that carbon may diffuse from a first material of lower carbon content across an interface into a second material of higher carbon content. In addition, it includes data that would intend to make it unobvious to select a silicon-bearing steel for the composition of a layer adjacent to one into which it is desired to avoid having carbon be introduced. To be more specific, it gives data to show that a layer bearing 3.80 percent silicon and an overall carbon content of 0.49 percent, placed adjacent to one containing 0.05 percent silicon and an overall carbon content of 0.45 percent, came to have, after heating and diffusing, an interface with 0.315 percent carbon in the former and 0.566 percent carbon in the latter. This indicates that carbon will leave a steel in which it has higher activity to enter into one of the lower activity, even if the latter has a higher carbon content. This higher activity can be caused by richer silicon levels.

It is maintained that the prior art has not, prior to the present invention, made it obvious to persons of ordinary skill in the art what would happen with the use of a relatively thin silicon-steel interleaving layer between a layer of plain-carbon steel and one of an austenitic stainless steel like AISI Type 304, let alone that using such an interleaving layer affords a way to overcome orange peel and other defects, and without resort to modifying the composition of the plain-carbon steel by incorporating therein carbide-former elements like titanium and columbium.

BRIEF SUMMARY OF THE INVENTION

To obtain a composite material which has a substantially reduced incidence of defects after forming, there is made a composite having at least one layer of plain-carbon steel and, between it and a layer of stainless steel, an interleaving layer of silicon steel.

DESCRIPTION OF THE DRAWINGS

A complete understanding of the invention may be obtained from the foregoing and following description thereof, taken in conjunction with the appended drawing, the sole FIGURE of which is a cross-sectional view of one embodiment of a composite material in accordance with the present invention.

DESCRIPTION OF THE PREFERRED EMBODIMENTS

Figure 1:
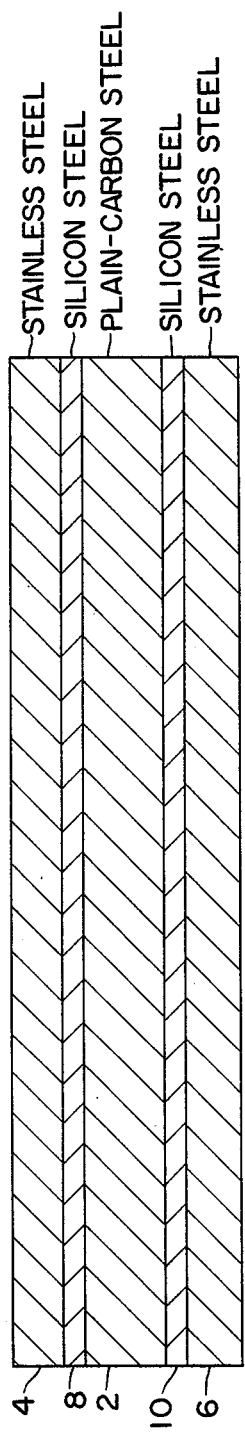

As is shown in the drawing, one preferred embodiment of the invention comprises a composite material having a central layer 2 of plain-carbon steel, clad exteriorly with layers 4 and 6 of stainless steel, and with additional thin interleaving layers 8 and 10 of silicon steel located between the exterior layers 4 and 6 and the central layer 2.

Those skilled in the art require no particular instruction about how to make, from suitable sheets and slabs of material, a suitable initial assembly, which may then be suitably bonded by heating and rolling to a desired thickness of sheet, capable of being drawn to form a final product. Such known procedure typically involves hot rolling at a temperature in excess of 1600 degrees Fahrenheit to form a bond or bonds, cold-rolling and annealing the cold-rolled composite at a temperature in excess of 1800 degrees Fahrenheit, thereby obtaining a composite having a yield strength at 0.2 percent offset of under 50,000 pounds per square inch. The composite material is one in which the stainless steel layer or layers have a portion thereof adjacent to the silicon-steel layer which is substantially free from being enriched with carbides, and preferably, the plain-carbon layer or stratum of the as-rolled composite exhibits an ASTM grain size of 3 or finer.

As one example, there may be made an assembly wherein the central layer 2 is of AISI Type 1006 plain-carbon steel with a thickness of 3.25 inches, and the layers 4 and 6 are of AISI Type 304 austenitic stainless steel having a thickness of 0.9 inch, and the interleaving layers 8 and 10, each having a thickness of 0.009 inch, are made of a silicon-containing electrical steel, such as SX-11, a low-carbon steel containing about 3.25 percent silicon.

The compositions and the thicknesses of the various materials comprising the various layers may be varied within limits. The stainless steel and the silicon steel are relatively expensive, in comparison with plain-carbon steel, so that there is an incentive to limit the thickness of those layers to whatever is required for obtaining the desired results. The thickness of the layer of silicon steel will always comprise 25 percent or less of the overall thickness of the overall assembly, and the silicon-containing steel will also contain over 0.5 percent of silicon. If less than 0.5 percent silicon is used the activity would be similar to the carbon steel in the core. The upper limit of 4.5 percent silicon is dependant upon formability and bondability. Other than that, the compositions of the layers 2-10 may be varied considerably, but always consistent with the requirement of obtaining a composite exhibiting adequate formability. The cladding layers 4 and 6 are typically chromium-nickel or chromium-nickel-manganese austenitic stainless steels. The cladding product can include ferritic stainless steels but carbon migration does not occur in such an assembly. It is especially advantageous to have a relatively thick central layer 2 of plain-carbon steel which is of a composition not modified by the addition of carbide former such as titanium and columbium, as it has been discovered that it is possible to avoid the defects and difficulties in drawing or other forming methods caused by carbon migration by the use of the interleaving layers 8 and 10.

While I have shown and described herein a certain embodiment of my invention, I intend to cover as well any change or modification therein which may be made without departing from its spirit and scope.

What we claim is:

1. A method of making a composite drawn article comprised of at least a central stratum of plain-carbon steel and two exterior strata of stainless steel, said method comprising the steps of:

forming an article which contains a central stratum of plain-carbon steel and two exterior strata of stainless steel, with interleaving strata between said exterior strata and said stratum of plain-carbon steel, said interleaving strata being of steel containing more than 0.50 and up to 4.5 weight percent silicon, and said interleaving strata having between them a thickness of less than 25 percent of that of the entire article;

hot rolling said article at a temperature in excess of 1600 degrees F. so as to form a bond therebetween and thereby produce a composite;

cold rolling said composite;

annealing the cold-rolled composite at a temperature in excess of 1800 degrees F., said composite having a yield strength at 0.2 percent offset of under 50,000 pounds per square inch; and forming by deep drawing the annealed composite, thereby producing a composite deep drawn article.

2. A method as defined in claim 1, wherein said plain-carbon steel is AISI Type 1006 steel.

3. A method as defined in claim 1, wherein said stainless steel is a chromium-nickel or chromium-nickel-manganese austenitic stainless steel.

4. A method as defined in claim 3, wherein said stainless steel is AISI Type 304 stainless steel.

* * * * *